Patented Feb. 24, 1953

2,629,741

UNITED STATES PATENT OFFICE 2,629,741

CHLOROPHENOXYACETALDEHYDES

Lewis R. Drake, Midland, Mich., assignor to The Dow Chemical Company, Midland, Mich., a corporation of Delaware No Drawing. Application February 27, 1950, Serial No. 146,629

6 Claims. (Cl. 260—600)

This invention is concerned with chlorophenoxyacetaldehydes of the formula

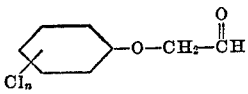

where $n$ is an integer not greater than 5. These new compounds are crystalline solids or oily liquids, somewhat soluble in many organic solvents and substantially insoluble in water. They are of value as intermediates for the preparation of more complex organic compounds and as constituents of plant growth control compositions.

The new compounds may be prepared by various methods. A preferred procedure comprises reacting a chlorophenoxyacetaldehyde diethyl acetal of the formula,

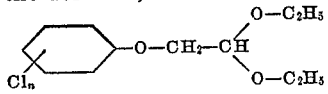

wherein $n$ is an integer from 1 to 5, with a molecular excess of water. The reaction is carried out in the presence of acetic acid and sulfuric acid as hydrolyzing agents. Good results have been obtained when employing a small amount of sulfuric acid and an amount of acetic acid equal to at least twice the molecular proportion of the chlorophenoxyacetaldehyde diethyl acetal employed in the reaction. In practice, the chlorophenoxyacetaldehyde diethyl acetal, sulfuric acid, and acetic acid are dispersed in water and the resulting mixture boiled for a period of time sufficient to complete the reaction. The reaction mixture may then be treated in conventional fashion to separate the desired product.

The chlorophenoxyacetaldehyde diethyl acetals employed as starting materials as above described may be prepared by reacting a sodium chlorophenate with chloroacetal (1-chloro-2,2-diethoxyethane). In carrying out the reaction, substantially equimolecular proportions of chloroacetal, sodium methylate, and a chlorophenol are dispersed in ethanol and the resulting mixture heated under autogenous pressure to a temperature of from about 140° to 160° C. for a period of time required to complete the reaction. The reaction mixture may then be filtered and the filtrate fractionally distilled under reduced pressure to obtain the desired product. The preparation and properties of these materials are described in a copending application Serial No. 146,630, now Patent No. 2,553,555, filed concurrently herewith.

The preferred embodiments of this invention comprise 2,4-dichlorophenoxyacetaldehyde and 2,4,5-trichlorophenoxyacetaldehyde.

The following examples illustrate the invention but are not to be construed as limiting:

EXAMPLE 1

*4-chlorophenoxyacetaldehyde*

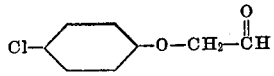

84 grams (0.34 mole) of 4-chlorophenoxyacetaldehyde diethyl acetal (having a boiling point of 145° C. at 8 millimeters pressure and a density of 1.116 at 25° C.), 48.5 grams of 10 per cent aqueous sulfuric acid, and 48.5 grams of acetic acid were dispersed in 485 milliliters of water, and the resulting mixture boiled with stirring for 5½ hours. Upon standing, the crude reaction mixture separated into an aqueous and an organic layer. The organic layer was separated and fractionally distilled under reduced pressure to separate 4-chlorophenoxyacetaldehyde as an oily liquid. The latter had a boiling point of 128° C. at 6 millimeters pressure, a density of 1.181 at 23° C., and a refractive index $n$/D of 1.5738 at 35° C.

EXAMPLE 2

*2-chlorophenoxyacetaldehyde*

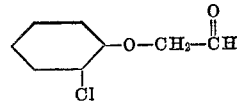

90 grams (0.37 mole) of 2-chlorophenoxyacetaldehyde diethyl acetal (having a refractive index $n$/D of 1.118 at 25° C.), 52 grams of 10 per cent aqueous sulfuric acid, and 52 grams of acetic acid were dispersed in 520 milliliters of water and the resulting mixture boiled for 5½ hours. Upon standing, the crude reaction mixture separated into an aqueous and an organic layer. The latter was separated and fractionally distilled under reduced pressure to obtain 2-chlorophenoxyacetaldehyde as an oily liquid boiling at 126° to 130° C. at 7.5 millimeters pressure, and having a density of 1.144 at 23° C. and a refractive index $n$/D of 1.5492 at 35° C.

EXAMPLE 3

*2,4-dichlorophenoxyacetaldehyde*

196 grams (0.33 mole) of 2,4-dichlorophenoxyacetaldehyde diethyl acetal (having a specific gravity of 1.2095 at 23° C. and a refractive index $n$/D of 1.5069 at 35° C.), 50 grams of 10 per cent aqueous sulfuric acid, and 50 grams of acetic acid were dispersed in 500 milliliters of water, and the resulting mixture boiled with stirring for 16 hours. The reaction mixture was then extracted with diethyl ether and the extract dried with calcium chloride. The diethyl ether was then removed from the dried extract by evaporation, and the residue fractionally distilled under reduced pressure to separate 2,4-dichlorophenoxyacetaldehyde, boiling at 138° to 142° C. at 4 millimeters pressure.

EXAMPLE 4

*2,4,6-trichlorophenoxyacetaldehyde*

100 grams (0.32 mole) of 2,4,6-trichlorophenoxyacetaldehyde diethyl acetal (having a density of 1.347 at 23° C. and a refractive index $n/D$ of 1.5702), 50 grams of 10 per cent aqueous sulfuric acid, and 50 grams of acetic acid were dispersed in 500 milliliters of water, and the resulting dispersion boiled with stirring for 16 hours. The reaction mixture was then extracted with diethyl ether and the extract fractionally distilled under reduced pressure to separate 2,4,6-trichlorophenoxyacetaldehyde as a white crystalline solid melting at 97° to 100° C.

2,3,4,6 - tetrachlorophenoxyacetaldehyde and pentachlorophenoxyacetaldehyde may be prepared from 2,3,4,6-tetrachlorophenoxyacetaldehyde diethyl acetal and pentachlorophenoxyacetaldehyde diethyl acetal, respectively, by substituting these acetals for the acetals in the examples.

I claim:

1. A chlorophenoxyacetaldehyde having the formula

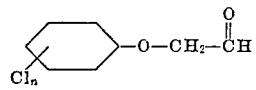

wherein $n$ is an integer from 1 to 5, inclusive.
2. 2,4,5-trichlorophenoxyacetaldehyde.
3. 4-chlorophenoxyacetaldehyde.
4. 2-chlorophenoxyacetaldehyde.
5. 2,4-dichlorophenoxyacetaldehyde.
6. 2,4,6-trichlorophenoxyacetaldehyde.

LEWIS R. DRAKE.

REFERENCES CITED

The following references are of record in the file of this patent:

UNITED STATES PATENTS

| Number | Name | Date |
|---|---|---|
| 2,286,034 | Gresham | June 9, 1942 |
| 2,390,941 | Jones | Dec. 11, 1945 |
| 2,416,263 | MacMullen | Feb. 18, 1947 |
| 2,500,582 | Smith et al. | Mar. 14, 1950 |

FOREIGN PATENTS

| Number | Country | Date |
|---|---|---|
| 673,379 | France | Jan. 14, 1930 |

OTHER REFERENCES

Yamashita et al., J. Chem. Soc. (Japan), vol. 64, pp. 506–08 (1943). Abstracted in Chem. Abstr., vol. 41, col. 3753 (1947).